(12) United States Patent
Takahashi et al.

(10) Patent No.: US 6,184,275 B1
(45) Date of Patent: Feb. 6, 2001

(54) CRYSTALLINE POLYMER COMPOSITION

(75) Inventors: Masayuki Takahashi; Etsuo Tobita, both of Saitama-ken (JP)

(73) Assignee: Asahi Denka Kogyo Kabushiki Kaisha, Tokyo (JP)

( * ) Notice: Under 35 U.S.C. 154(b), the term of this patent shall be extended for 0 days.

(21) Appl. No.: 09/373,573

(22) Filed: Aug. 13, 1999

(30) Foreign Application Priority Data

Aug. 21, 1998 (JP) .................................................. 10-235540

(51) Int. Cl.⁷ ....................................................... C08K 5/49
(52) U.S. Cl. ................................ 524/117; 558/73; 558/92
(58) Field of Search ........................ 558/73, 92; 524/117; 521/60, 92, 119

(56) References Cited

U.S. PATENT DOCUMENTS

| 4,463,113 | 7/1984 | Nakahara et al. . |
| 6,005,034 | * 12/1999 | Hayashida et al. .................. 524/117 |

FOREIGN PATENT DOCUMENTS 0 255 693    2/1988   (EP) .

* cited by examiner

*Primary Examiner*—Veronica P. Hoke
(74) *Attorney, Agent, or Firm*—Young & Thompson

(57) ABSTRACT

A crystalline polymer composition comprising 100 parts by weight of a crystalline polymer and 0.005 to 5 parts by weight of a compound represented by formula (I):

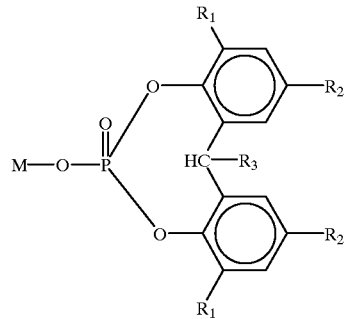

wherein $R_1$ and $R_2$ each independently represent an alkyl group having 1 to 9 carbon atoms; $R_3$ represents a hydrogen atom or an alkyl group having 1 to 4 carbon atoms; and M represents an alkali metal, the compound having a chlorine content of 500 ppm or less.

12 Claims, No Drawings

CRYSTALLINE POLYMER COMPOSITION

BACKGROUND OF THE INVENTION

1. Field of the Invention

This invention relates to a crystalline polymer composition and more particularly to a crystalline polymer composition containing 100 parts by weight of a crystalline polymer and 0.005 to 5 parts by weight of a compound represented by formula (I) hereinafter described having a chlorine content of 500 ppm or less.

2. Description of the Related Art

Crystalline polymers, such as polyethylene, polypropylene, polybutene-1, polyethylene terephthalate, polybutylene terephthalate, and polyamide, are slow in crystallization after heat molding and therefore have a low molding efficiency and need mold cooling. Further, they undergo mold shrinkage on crystallization. Furthermore, moldings of these crystalline polymers tend to have insufficient strength or poor transparency due to large crystals formed.

It is known that all these drawbacks are attributed to the crystallinity of the polymers and could be eliminated by increasing the crystallizing temperature of the polymers so as to produce fine crystals rapidly.

Addition of a nucleating agent or a nucleation accelerator is known effective for this purpose. Conventionally used nucleating agents or nucleation accelerators include carboxylic acid metal salts, such as aluminum 4-t-butylbenzoate and sodium adipate, acid phosphoric esters, such as sodium bis(4-t-butylphenyl)phosphate and sodium 2,2'-methylenebis(4,6-di-t-butylphenyl)phosphate, and polyhydric alcohol derivatives, such as dibenzylidene sorbitol and bis(methylbenzylidene) sorbitol.

Of these known compounds, metal salts of a cyclic phosphate of an alkylidenebisphenol disclosed in Japanese Patent Laid-Open Nos. 1736/83 and 184252/84, etc. are particularly effective and have been used widely. However, their effects are still sometimes insufficient, and cases are met with in which an alkali metal chloride is dissolved out in the polymer to cause surface roughness or voids, which are problematical in the practice.

SUMMARY OF THE INVENTION

An object of the present invention is to provide a crystalline polymer composition which is free from surface roughness or voids and excellent in strength and transparency.

In order to remove the above-described disadvantage of the metal salt of the alkylidenebisphenol cyclic phosphate, the inventors have conducted extensive investigation and found that the disadvantage is closely related to the chlorine content of the metal salt of the alkylidenebisphenol cyclic phosphate.

The metal salt of an alkylidenebisphenol cyclic phosphate which can be used in the present invention is usually prepared by allowing phosphorus trichloride (or phosphorus oxychloride) and a 2,2'-alkylidenephenol to react, followed by, if necessary, hydrolysis to obtain a cyclic acid phosphoric ester, which is then allowed to react with an alkali metal hydroxide, e.g., sodium hydroxide. The product is collected by filtration, dried, and, if desired, ground for use as a nucleating agent.

The compound thus prepared usually has a chlorine content exceeding 500 ppm. Therefore, where it is used in contact with water or under a high humidity condition, an alkali metal chloride dissolves out to cause surface roughness or voids.

Since it is extremely difficult to completely remove the chlorine content from the compound, the inventors aimed to find an acceptable range of the chlorine content for practical use. As a result, they have found that the outstanding problems are all settled by controlling the chlorine content in the alkylidenebisphenol cyclic phosphate to 500 ppm or less.

The present invention provides a crystalline polymer composition comprising 100 parts by weight of a crystalline polymer and 0.005 to 5 parts by weight of a compound represented by formula (I):

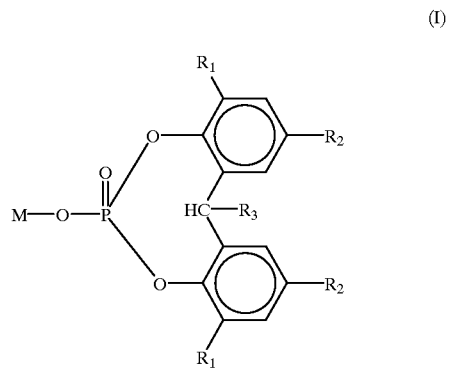

wherein $R_1$ and $R_2$ each independently represent an alkyl group having 1 to 9 carbon atoms; $R_3$ represents a hydrogen atom or an alkyl group having 1 to 4 carbon atoms; and M represents an alkali metal, the compound having a chlorine content of 500 ppm or less.

The crystalline polymer composition according to the present invention is free from surface roughness or voids and excellent in strength and transparency.

DETAILED DESCRIPTION OF THE INVENTION

The compound of formula (I) which is used in the present invention is useful as a nucleating agent.

In formula (I), the alkyl group having 1 to 9 carbon atoms as represented by $R_1$ or $R_2$ includes methyl, ethyl, propyl, isopropyl, butyl, sec-butyl, t-butyl, isobutyl, amyl, t-amyl, hexyl, heptyl, octyl, isooctyl, 2-ethylhexyl, t-octyl, nonyl, and t-nonyl groups. The alkyl group having 1 to 4 carbon atoms as represented by $R_3$ includes methyl, ethyl, propyl, isopropyl, butyl, sec-butyl, t-butyl, and isobutyl groups. The alkali metal as represented by M includes sodium, potassium, and lithium.

Of the compounds represented by formula (I), preferred are those in which $R_1$ is a tertiary alkyl group, such as a t-butyl group or a t-amyl group; $R_2$ is an alkyl group having 1 to 4 carbon atoms; and $R_3$ is a hydrogen atom or a methyl group.

It is still preferred that both $R_1$ and $R_2$ be t-butyl groups. In this case, $R_3$ is preferably a hydrogen atom, and M is preferably sodium or lithium. It is particularly preferred that both $R_1$ and $R_2$ be t-butyl groups; $R_3$ be a hydrogen atom; and M be sodium.

Accordingly, compounds shown below are preferred of the compounds represented by formula (I).

No. 1
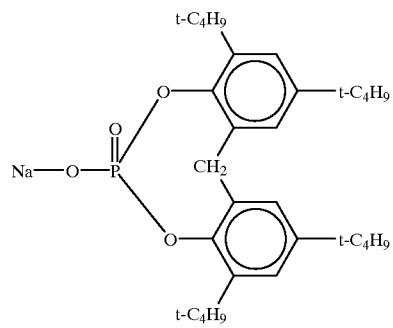

No. 2
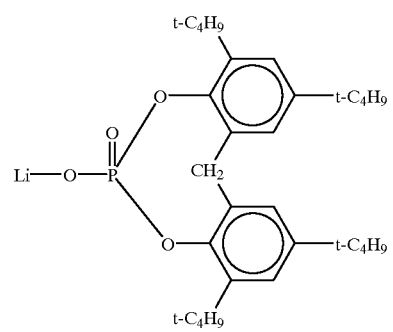

No. 3
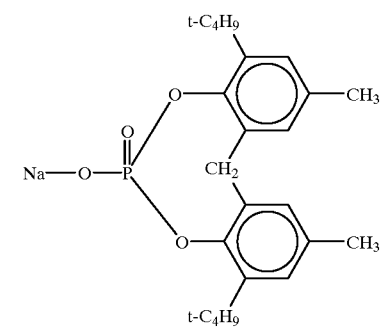

No. 4
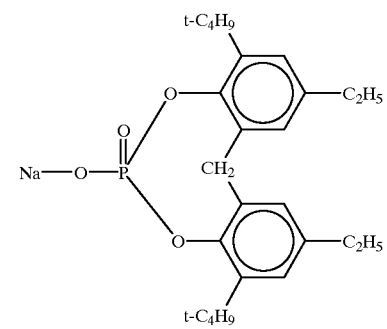

No. 5
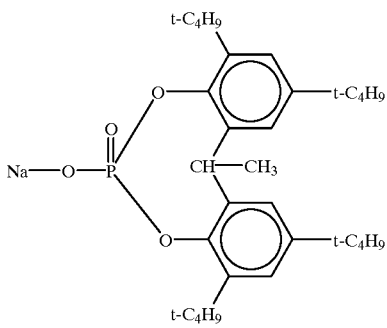

No. 6

The compounds of formula (I) are usually prepared by allowing phosphorus trichloride (or phosphorus oxychloride) and a 2,2'-alkylidenephenol to react, followed by, if necessary, hydrolysis to obtain a cyclic acid phosphoric ester and allowing the cyclic acid phosphoric ester to react with an alkali metal hydroxide, e.g., sodium hydroxide. The product is collected by filtration, dried, and, if desired, ground for use as a nucleating agent.

The compound thus prepared contains a large amount of chlorine, which is mainly derived from an alkali metal chloride, and usually has a chlorine content exceeding 500 ppm. Where it is used as such in contact with moisture, for example, in contact with water or under a high humidity condition, an alkali metal chloride, e.g., NaCl dissolves out to cause surface roughness or voids.

The present invention consists in using the compound of formula (I) having its chlorine content reduced to 500 ppm or less, preferably 300 ppm or less, still preferably 200 ppm or less, as a nucleating agent thereby to eliminate the above-mentioned disadvantage. Reduction of the chlorine content to 500 ppm or less can be achieved by, for example, proper selection of washing conditions, i.e., the number of times of washing, the amount of wash water, the temperature of wash water, the stirring time, and the washing time, or a method comprising dissolving the compound in an organic solvent followed by filtration to remove any insoluble inorganic salt. While the lower limit of the chlorine content is not particularly limited, it is practically impossible to reduce the chlorine content of 1 ppm or less.

The compound of formula (I) having a chlorine content of 500 ppm or less is used in an amount of 0.005 to 5 parts by weight, preferably 0.01 to 3 parts by weight, per 100 parts by weight of a crystalline polymer. When added in an amount less than 0.005 part by weight, the compound hardly serves as a nucleating agent. Even if the compound is added in amounts exceeding 5 parts, no further effects is expected for amount, but adverse effects on other various physical properties and bad economy result.

The crystalline polymers which can be used in the crystalline polymer composition of the present invention include α-olefin polymers, such as low-density polyethylene, linear low-density polyethylene, high-density polyethylene, polypropylene, polybutene-1, poly-3-methylbutene, ethylene-propylene block or random copolymers; thermoplastic linear polyesters, such as polyethylene terephthalate, polybutylene terephthalate, and polyhexamethylene terephthalate; linear polyamides, such as polycaprolactam and polyhexamethylene adipamide; syndiotactic polystyrene, and polyphenylene sulfide.

Particularly useful crystalline polymers in the present invention are polyolefins, such as crystalline α-olefin polymers, especially polyethylene and propylene resins, such as polypropylene, filler-loaded polypropylene, an ethylene-propylene copolymer, and polyblends of these propylene resins and other α-olefin polymers. The ethylene-propylene copolymer is preferably a block copolymer or a random copolymer. These propylene resins can be used irrespective of their intrinsic viscosity, isotactic pentad content, density, molecular weight distribution, melt flow rate, rigidity, and the like. The propylene resins described in Japanese Patent Laid-Open Nos. 37148/88, 37152/88, 90552/88, 210152/88, 213547/88, 243150/88, 243152/88, 260943/88, 260944/88, 264650/88, 178541/89, 49047/90, 102242/90, 251548/90, 279746/90, and 195751/91 are also suitable.

The manner of adding the compound represented by formula (I) to the crystalline polymer is not particularly restricted, and commonly followed methods are applicable. For example, powder of the compound of formula (I) is mixed into powder or pellets of the crystalline polymer by dry blending.

If desired, the crystalline polymer composition can contain phenol type antioxidants, thioether type antioxidants, phosphite type antioxidants, metal soaps, pigments, fillers, organotin compounds, plasticizers, epoxy compounds, foaming agents, antistatics, flame retardants, lubricants, processing aids, and so forth.

The crystalline polymer composition according to the present invention can be processed into various molded articles, fiber, biaxially stretched films, sheeting, and the like.

The crystalline polymer composition of the present invention is also useful in the medical field as syringes, syringe preparations, infusion bags, etc. The composition of the invention is also suited as molded articles that are subjected to various post treatments, such as molded articles for medical use or packaging materials for food which are subjected to irradiation sterilization or low temperature plasma treatment for improving surface properties, such as coating properties.

The present invention will now be illustrated in greater detail, but it should be understood that the invention is not construed as being limited thereto.

EXAMPLE 1

The following composition was kneaded in a rolling mill at 180° C. for 5 minutes, compression molded at 180° C. under 250 kg/cm$^2$ for 5 minutes, and rapidly cooled to 60° C. to prepare a 1 mm thick sheet. The sheet was stretched 10 times longitudinally and 10 times laterally on a tentor type successive biaxial stretching machine to obtain a biaxially stretched film having a thickness of about 10 μm. The chlorine content of the compound of formula (I) used in the composition had been adjusted by varying the washing conditions, such as the number of times of washing, the amount of wash water, the temperature of wash water, the stirring time, and the washing time, and the like.

| Composition: | |
| --- | --- |
| Polypropylene (Profax) | 100 (parts by wt.) |
| Calcium stearate | 0.005 |
| Tetrakis[methylene-β-(3,5-di-t-butyl-4-hydroxyphenyl)propionate]methane | 0.1 |
| Compound of formula (I) (see Table 1) | 0.1 |

The resulting stretched film was observed with the naked eye to evaluate the surface roughness according to the following rating system. Further, the stretched film was microscopically observed to measure voids. The results obtained are shown in Table 1.

Standard of Rating:

1 . . . Smooth surface with no roughness.

2 . . . Substantially smooth surface with slight roughness.

3 . . . Roughness observed on nearly a half of the surface.

4 . . . Roughness observed on almost the entire surface.

TABLE 1

| | | Compound of formula (I) | | |
| --- | --- | --- | --- | --- |
| | Run No. | No. | Residual Cl Content (ppm) | Surface Roughness | Voids |
| Examples | 1-1 | 1 | 165 | 2 | nil |
| | 1-2 | 1 | 30 | 1 | nil |
| | 1-3 | 1 | 3 | 1 | nil |
| | 1-4 | 2 | 85 | 2 | nil |
| | 1-5 | 3 | 160 | 2 | nil |
| Comparative Examples | 1-1 | 1 | 750 | 4 | observed |
| | 1-2 | 2 | 550 | 4 | observed |

EXAMPLE 2

The same composition as used in Example 1 was kneaded in a rolling mill at 180° C. for 5 minutes, compression molded at 180° C. under 250 kg/cm$^2$ for 5 minutes, and rapidly cooled to 60° C. to prepare a 1 mm thick specimen. The chlorine content of the compound of formula (I) used in the composition had been adjusted by varying the washing conditions, such as the number of times of washing, the amount of wash water, the temperature of wash water, the stirring time, and the washing time, and the like.

The haze value of the specimen was measured in accordance with ASTM D-1003-61. Further, the specimen was allowed to stand at 50° C. and 100% RH for 1 week, and the change in surface gloss at 60° C. was measured in accordance with ASTM D-523-63T. The results obtained are shown in Table 2.

TABLE 2

| | | Compound of Formula (I) | Haze | Storage Stability | |
|---|---|---|---|---|---|
| Run No. | No. | Residual Cl Content (ppm) | Value (%) | Initial Gloss | Gloss after 1 Week |
| Examples | 2-1 | 1 | 165 | 18 | 115 | 114 |
| | 2-2 | 1 | 30 | 16 | 120 | 119 |
| | 2-3 | 1 | 3 | 15 | 121 | 121 |
| | 2-4 | 2 | 85 | 17 | 117 | 116 |
| | 2-5 | 3 | 160 | 18 | 116 | 115 |
| Comparative Examples | 2-1 | 1 | 750 | 20 | 112 | 107 |
| | 2-2 | 2 | 550 | 20 | 114 | 110 |

The results in Tables 1 and 2 prove that the compound of formula (I) whose chlorine content has been reduced to 500 ppm or less, when added as a nucleating agent to a crystalline polymer, is effective in inhibiting development of surface roughness and voids and in improving the storage stability in gloss.

What is claimed is:

1. A crystalline polymer composition comprising 100 parts by weight of a crystalline polymer and 0.01 to 3 parts by weight of a compound represented by formula (I):

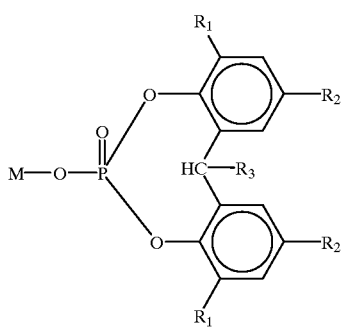

(I)

wherein $R_1$ and $R_2$ each independently represent an alkyl group having 1 to 9 carbon atoms; $R_3$ represents a hydrogen atom or an alkyl group having 1 to 4 carbon atoms; and M represents an alkali metal, the compound having a chlorine content of 200 ppm or less.

2. A crystalline polymer composition according to claim 1, wherein $R_1$ and $R_2$ in formula (I) are each a t-butyl group.

3. A crystalline polymer composition according to claim 2, wherein $R_3$ in formula (I) is a hydrogen atom.

4. A crystalline polymer composition according to claim 2, wherein M in formula (I) is sodium.

5. A crystalline polymer composition according to claim 2, wherein M in formula (I) is lithium.

6. A crystalline polymer composition according to claim 1, wherein $R_1$ and $R_2$ are each a t-butyl group, $R_3$ is a hydrogen atom, and M is sodium in formula (I).

7. A crystalline polymer composition according to claim 1, wherein the crystalline polymer is a polyolefin.

8. A crystalline polymer composition according to claim 1, wherein the crystalline polymer is polyethylene.

9. A crystalline polymer composition according to claim 1, wherein the crystalline polymer is polypropylene.

10. A crystalline polymer composition according to claim 1, wherein the crystalline polymer is filler-loaded polypropylene.

11. A crystalline polymer composition according to claim 1, wherein the crystalline polymer is an ethylene-propylene block copolymer.

12. A crystalline polymer composition according to claim 1, wherein the crystalline polymer is an ethylene-propylene random copolymer.

* * * * *